US009682321B2

(12) United States Patent
Iannetta (10) Patent No.: US 9,682,321 B2
(45) Date of Patent: Jun. 20, 2017

(54) MULTIPLE FRAME DISTRIBUTED RENDERING OF INTERACTIVE CONTENT

(75) Inventor: Damiano Luciano Iannetta, Birmingham (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 288 days.

(21) Appl. No.: 13/528,627

(22) Filed: Jun. 20, 2012

(65) Prior Publication Data

US 2013/0344961 A1 Dec. 26, 2013

(51) Int. Cl.
| | | |
|---|---|---|
| G06T 13/00 | (2011.01) | |
| A63F 13/52 | (2014.01) | |
| G09G 5/02 | (2006.01) | |
| G09G 5/14 | (2006.01) | |
| A63F 13/428 | (2014.01) | |
| A63F 13/355 | (2014.01) | |
| A63F 13/213 | (2014.01) | |
| A63F 13/833 | (2014.01) | |

(52) U.S. Cl.
CPC ............ *A63F 13/52* (2014.09); *A63F 13/213* (2014.09); *A63F 13/355* (2014.09); *A63F 13/428* (2014.09); *G09G 5/026* (2013.01); *G09G 5/14* (2013.01); *A63F 13/833* (2014.09); *G06T 13/00* (2013.01); *G09G 2340/16* (2013.01); *G09G 2354/00* (2013.01)

(58) Field of Classification Search
CPC .. G06T 13/00; G06T 13/80; G06F 2207/2014
USPC ......................................... 345/100–158, 418
See application file for complete search history.

(56) References Cited

U.S. PATENT DOCUMENTS

| | | | | |
|---|---|---|---|---|
| 5,696,892 | A | * | 12/1997 | Redmann et al. ............ 345/582 |
| 5,864,342 | A | * | 1/1999 | Kajiya .................. G06T 11/001 345/418 |
| 6,064,393 | A | | 5/2000 | Lengyel et al. |
| 6,326,964 | B1 | | 12/2001 | Snyder et al. |
| 7,834,846 | B1 | * | 11/2010 | Bell ............................. 345/156 |
| 2008/0246759 | A1 | * | 10/2008 | Summers ..................... 345/420 |
| 2009/0186693 | A1 | * | 7/2009 | Panoff ............................ 463/31 |

(Continued)

OTHER PUBLICATIONS

Tse, et al., "Image-Based Bidirectional Scene Reprojection", Retrieved at <<http://www.cse.ust.hk/~psander/docs/bireprojtech.pdf>>, May 12, 2010, pp. 1-10.

(Continued)

*Primary Examiner* — James S McClellan
*Assistant Examiner* — Syvila Weatherford (57) ABSTRACT

Techniques for multiple frame distributed rendering of interactive content are described. In implementations, interactive content includes various types of visual content, such as video games, interactive videos, interactive applications, and so forth. Interactive content includes scene objects, such as graphical renderings of visual scenery and background images. Interactive content also includes interactive objects, such as avatars and/or other visuals that can be displayed in the context of scene objects and that can be manipulated in response to user input. In at least some embodiments, scene objects can be rendered over multiple frames of interactive content prior to being displayed, and interactive objects can be rendered and displayed more frequently, e.g., with each frame.

20 Claims, 6 Drawing Sheets

(56) References Cited

U.S. PATENT DOCUMENTS

| | | | | |
|---|---|---|---|---|
| 2009/0244309 | A1* | 10/2009 | Maison et al. | 348/222.1 |
| 2009/0267956 | A1* | 10/2009 | Greaves et al. | 345/555 |
| 2010/0053083 | A1* | 3/2010 | Hwang | 345/158 |
| 2010/0277411 | A1* | 11/2010 | Yee et al. | 345/156 |
| 2010/0302138 | A1* | 12/2010 | Poot et al. | 345/156 |
| 2011/0267269 | A1 | 11/2011 | Tardif et al. | |
| 2013/0070047 | A1* | 3/2013 | DiGiovanni et al. | 348/36 |

OTHER PUBLICATIONS

Drettakis, et al., "An Interactive Perceptual Rendering Pipeline using Contrast and Spatial Masking", Retrieved at << http://hal.inria.fr/docs/00/60/67/96/PDF/thresholdmaps.pdf>>, Proceedings of the Eurographics Symposium on Rendering, Jun. 25, 2007, pp. 297-308.

Hauswiesner, et al., "Coherent Image-Based Rendering of Real-World Objects", Retrieved at <<http://www.icg.tu-graz.ac.at/Members/hauswies/coherent-image-based-rendering-of-real-world-objects-1>>, Proceedings of Symposium on Interactive 3D Graphics and Games, Feb. 18, 2011, pp. 183-190.

Yee, et al., "Spatiotemporal Sensitivity and Visual Attention for Efficient Rendering of Dynamic", Retrieved at <<http://www.icg.tu-graz.ac.at/Members/hauswies/coherent-image-based-rendering-of-real-world-objects-1>>, Proceedings of ACM Journal Transactions on Graphics, vol. 20 Issue 1 , Jan. 2001, pp. 39-65.

Matusik, et al., "Distributed Rendering for Multiview Parallax Displays", Retrieved at <<http://people.csail.mit.edu/wojciech/pubs/DistributedRendering.pdf>>, Proceedings of Stereoscopic Displays and Virtual Reality Systems XIII, Jan. 2006, pp. 231-240.

* cited by examiner

МULTIPLE FRAME DISTRIBUTED RENDERING OF INTERACTIVE CONTENT

BACKGROUND

Today's digital environment offers a tremendous array of visual content, such as videos, video games, web content (e.g., web pages), and so forth. Further, users can often interact with many types of visual content. For example, a user can control an interactive object, such as an avatar, as part of playing a video game.

To enable visual content to be displayed, visual content is typically rendered according to a particular frame rate, such as determined in frames per second (FPS), hertz (Hz), and so on. Determining which frame rate to use for a particular instance of visual content involves a number of considerations, such as graphic resolution, responsiveness, and so on.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for multiple frame distributed rendering of interactive content are described. In implementations, interactive content includes various types of visual content, such as video games, interactive videos, interactive applications, and so forth. Interactive content includes scene objects, such as graphical renderings of visual scenery and background images. Interactive content also includes interactive objects, such as avatars and/or other visuals that can be displayed in the context of scene objects and that can be manipulated in response to user input. In at least some embodiments, scene objects can be rendered over multiple frames of interactive content prior to being displayed, and interactive objects can be rendered and displayed more frequently, e.g., with each frame.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for multiple frame distributed rendering of interactive content are described. In implementations, interactive content includes various types of visual content, such as video games, interactive videos, interactive applications, and so forth. Interactive content includes scene objects, such as graphical renderings of visual scenery and background images. Interactive content also includes interactive objects, such as avatars and/or other visuals that can be displayed in the context of scene objects and that can be manipulated in response to user input. In at least some embodiments, scene objects can be rendered over multiple frames of interactive content prior to being displayed, and interactive objects can be rendered and displayed more frequently, e.g., with each frame.

For example, consider a video game scenario that includes an avatar that a user can manipulate to participate in gameplay. The avatar can be displayed and can be manipulated in the context of a scene object, such as a gameplay arena. To provide increased time for visual processing of the scene object, visual processing of the scene object can be distributed over multiple frames, such as over two or more frames of the interactive content. Thus, a visual display of the scene object can be updated intermittently during gameplay, such as in every other frame. To provide increased responsiveness of the avatar to user input, the avatar can be rendered and visually updated more frequently, such as on a frame-by-frame basis.

For instance, consider an example implementation where the video game is rendered at 60 hertz (Hz), e.g., visual frames are updated at a frequency of 60 Hz. In such a scenario, the avatar can be rendered and visually updated at 60 Hz, e.g., with each frame of the video game during gameplay. Scene objects, however, can be rendered at 30 Hz, e.g., with every two frames of the video game during gameplay. Thus, the scene objects can be visually updated at 30 Hz, with the intervening frame providing additional time for visual rendering. This implementation is provided for purpose of example only, and a wide variety of different frame rates and rendering patterns can be employed within the spirit and scope of the claimed embodiments.

In the following discussion, an example environment is first described that is operable to employ techniques for multiple frame distributed rendering of interactive content described herein. Next, a section entitled "Example Implementation Scenarios" describes example implementation scenarios in accordance with one or more embodiments. Following this, a section entitled "Example Procedures" describes some example procedures for implementation of multiple frame distributed rendering of visual objects in accordance with one or more embodiments. Finally, an example system and device are described that are operable to employ techniques discussed herein in accordance with one or more embodiments.

Example Environment

Figure 1:
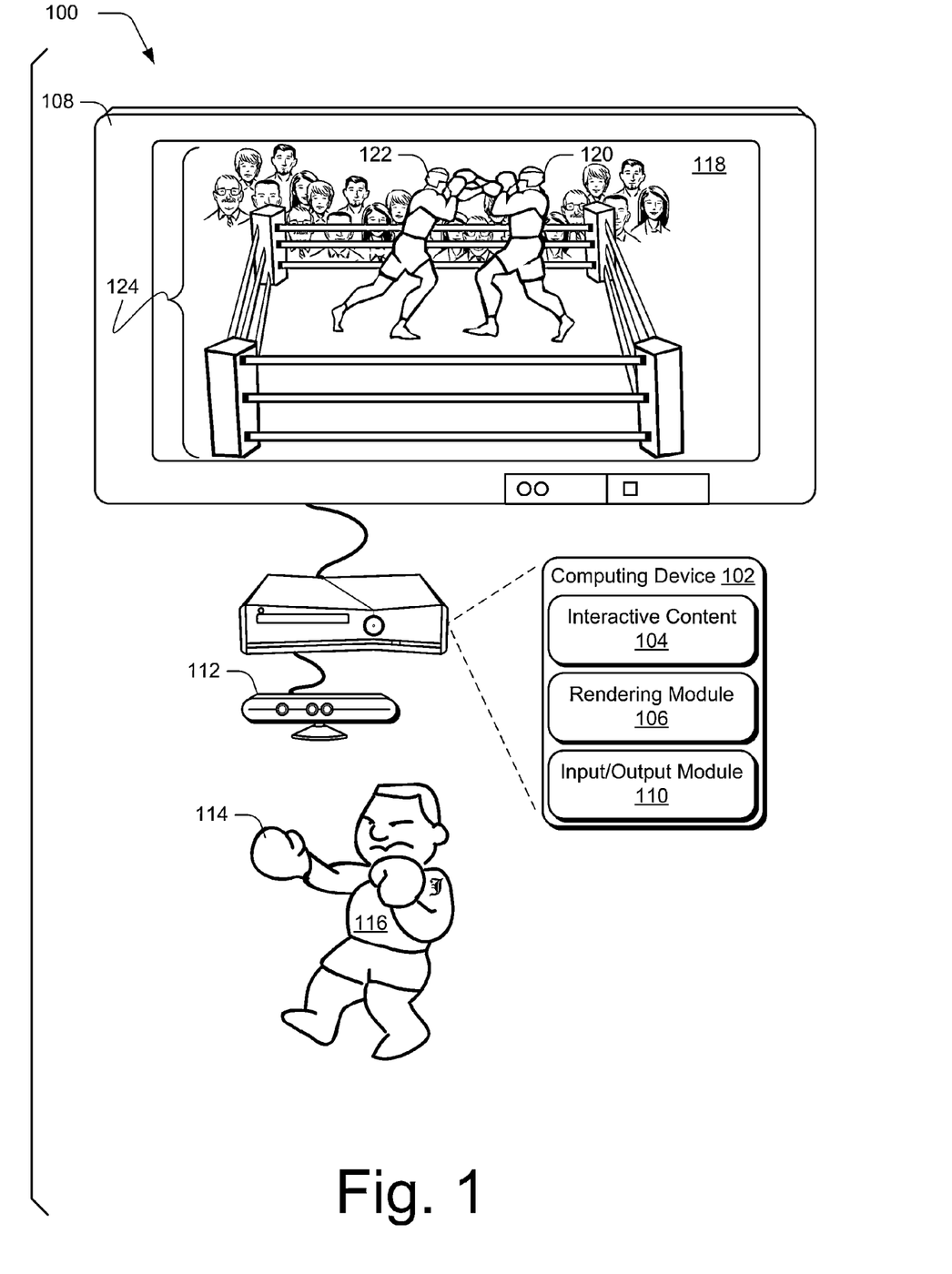
FIG. 1 is an illustration of an environment in an example implementation that is operable to employ techniques discussed herein.

FIG. 1 is an illustration of an environment 100 in an example implementation that is operable to implement techniques for multiple frame distributed rendering of interactive content discussed herein. The illustrated environment 100 includes a computing device 102. Although the computing device 102 is illustrated as a game console, the computing device 102 may be configured in a variety of other ways. For instance, the computing device 102 may be configured as a desktop computer, a mobile station, an entertainment appliance, a set-top box communicatively coupled to a display device, a mobile communication device (e.g., a tablet, a smartphone), and so forth.

Accordingly, the computing device 102 may range from full resource devices with substantial memory and processor resources (e.g., personal computers, game consoles) to low-resource devices with limited memory and/or processing resources (e.g., traditional set-top boxes, hand-held game consoles). Additionally, although a single computing device 102 is shown, the computing device 102 may be representative of a plurality of different devices, such as a user-wearable helmet and game console, multiple servers utilized by a business to perform operations that provide a cloud-based platform, a remote control and set-top box combination, and so on. One of a variety of different examples of a computing device 102 is shown and described below in FIG. 6.

Included as part of the computing device 102 is interactive content 104, which includes various types of visual content (as well as other forms of content) with which a user can interact. Examples of the interactive content 104 include video games, video content (e.g., pre-recorded and/or interactive video content), web content (e.g., web pages), and so forth. In implementations, the interactive content 104 can be stored locally on the computing device 102, and/or can be stored on some form of removable computer-readable storage media. For example, the interactive content 104 can be stored on a digital versatile disc (DVD) that can be read by the computing device 102. Alternatively or additionally, the interactive content 104 can be stored on a network resource, such as a cloud resource discussed below with reference to FIG. 6. For example, the interactive content 104 can be embodied as cloud-based content that can be streamed to the computing device 102 from a remote resource.

The computing device 102 further includes a rendering module 106, which is representative of functionality for performing various tasks related to the techniques for multiple frame distributed rendering of interactive content discussed herein. The rendering module 106, for instance, can include and/or leverage rendering engine functionality to process the interactive content 104 for display via a display device 108 coupled to the computing device 102.

An input/output module 110 is further included, which is representative of functionality to receive and recognize various forms of input for the computing device 102. For example, the input/output module 110 can be configured to receive input generated by an input device, such as a keyboard, a mouse, a touchpad, a game controller, an optical scanner, and so on. The input/output module 110 can also be configured to receive and/or interpret input received via a touchless mechanism, such as via voice recognition, gesture-based input, detected body poses and body motions, object scanning, and so on.

Further included as part of the computing device 102 is an NUI device 112, which is configured to receive a variety of touchless input, such as via visual recognition of human gestures, object scanning, voice recognition, color recognition, and so on. In at least some embodiments, the NUI device 112 is configured to recognize gestures, poses, body movements, objects, images, and so on, via cameras. An example camera, for instance, can be configured with lenses, light sources, and/or light sensors such that a variety of different phenomena can be observed and captured as input. For example, the camera can be configured to sense movement in a variety of dimensions, such as vertical movement, horizontal movement, and forward and backward movement, e.g., relative to the NUI device 112. Thus, in at least some embodiments, the NUI device 112 can capture information about image composition, movement, and/or position. The input/output module 110 can utilize this information to perform a variety of different tasks, such as interaction with the interactive content 104.

For example, the input/output module 110 can leverage the NUI device 112 to perform skeletal mapping along with feature extraction with respect to particular points of a human body (e.g., different skeletal points) to track one or more users (e.g., four users simultaneously) to perform motion analysis. In at least some embodiments, feature extraction refers to the representation of the human body as a set of features that can be tracked to generate input. For example, the skeletal mapping can identify points on a human body that correspond to a right hand 114 of a user 116. The input/output module 110 can use feature extraction techniques to recognize the points as a right hand and to characterize the points as a feature that can be tracked and used to generate input. Further to at least some embodiments, the NUI device 112 can capture images that can be analyzed by the input/output module 110 to recognize one or more motions and/or positioning of body parts or other objects made by a user, such as what body part is used to make a motion, a position (e.g., angle) of a body part relative to other body parts, which user made a motion, and so on.

In implementations, a variety of different types of gestures may be recognized, such as gestures that are recognized from a single type of input as well as gestures combined with other types of input, e.g., a hand gesture and voice input. Thus, the input/output module 110 can support a variety of different gestures and/or gesturing techniques by recognizing and leveraging a division between inputs. It should be noted that by differentiating between inputs of the NUI device 112, a particular gesture can be interpreted in a variety of different ways when combined with another type of input. For example, although a gesture may be the same, different parameters and/or commands may be indicated when the gesture is combined with different types of inputs. Additionally or alternatively, a sequence in which gestures are received by the NUI device 112 can cause a particular gesture to be interpreted as a different parameter and/or command. For example, a gesture followed in a sequence by other gestures can be interpreted differently than the gesture alone.

Displayed on the display device 108 is a graphical user interface (GUI) 118, which is generated and managed according to various techniques discussed herein. For example, the GUI 118 displays visual attributes of the interactive content 104, and can reflect user interaction with the interactive content 104.

Displayed on the GUI 118 is an interactive object 120 of the interactive content 104, which is controllable based on input received from the user 116. The interactive object 120 can be an animated version of the user 116, such as an avatar that is generated using computer animation and/or CGI techniques. Alternatively or additionally, the interactive object 120 can be a real-time video image of the user 116, e.g., as captured by a video camera such as utilized by the NUI device 112. As yet a further example, the interactive object 120 can be generated by enhancing a live video image of the user 116 using 2-dimensional (2D) and/or 3-dimensional (3D) computer graphics techniques. Thus, in implementations the interactive object 120 can move along with the user 116 such that movements of the user 116 are reflected in similar movements of the interactive object 120, e.g., in real time.

In this particular example, the interactive content 104 includes a boxing video game, and the interactive object 120 is an avatar that the user 116 can control to compete with an opponent avatar 122 as part of a boxing match. In at least some embodiments, the opponent avatar 122 can be controlled by another user. Alternatively or additionally, the opponent avatar 122 can be controlled automatically via logic executing on the computing device 102, such as logic included as part of the interactive content 104.

While embodiments are discussed herein with reference to manipulating interactive objects via touchless input (e.g., gesture recognition), this is not to be construed as limiting on the claimed subject matter. An interactive object, for instance, can be manipulated via a variety of different types and/or combinations of input in accordance with the claimed embodiments, such as input from a keyboard, a game controller, a touchpad, touchscreen input, voice input, and so forth.

Further displayed in the GUI 118 are scene objects 124 of the interactive content 104. The scene objects 124 are representative of further visual aspects of the interactive content 104. For example, the scene objects 124 can include visual scenery in which the interactive object 120 can be displayed, such as background visuals, visual props, and so forth. In this example, the scene objects 124 include visual elements of a boxing ring in which the interactive object 120 and the opponent avatar 122 can be displayed and interact as part of the video game. The scene objects 124 further include visuals of spectators viewing the boxing match. As detailed elsewhere herein, ways in which the interactive object 120 is visually rendered can differ from ways in which the scene objects 124 are rendered, to enable the interactive object 120 to be responsive to user input, while enabling the scene objects 124 to be rendered with high visual detail and/or resolution.

Having discussed an example environment in which techniques discussed herein can be implemented in accordance with one or more embodiments, consider now a discussion of an example implementation scenario.

Example Implementation Scenarios

Figure 2:
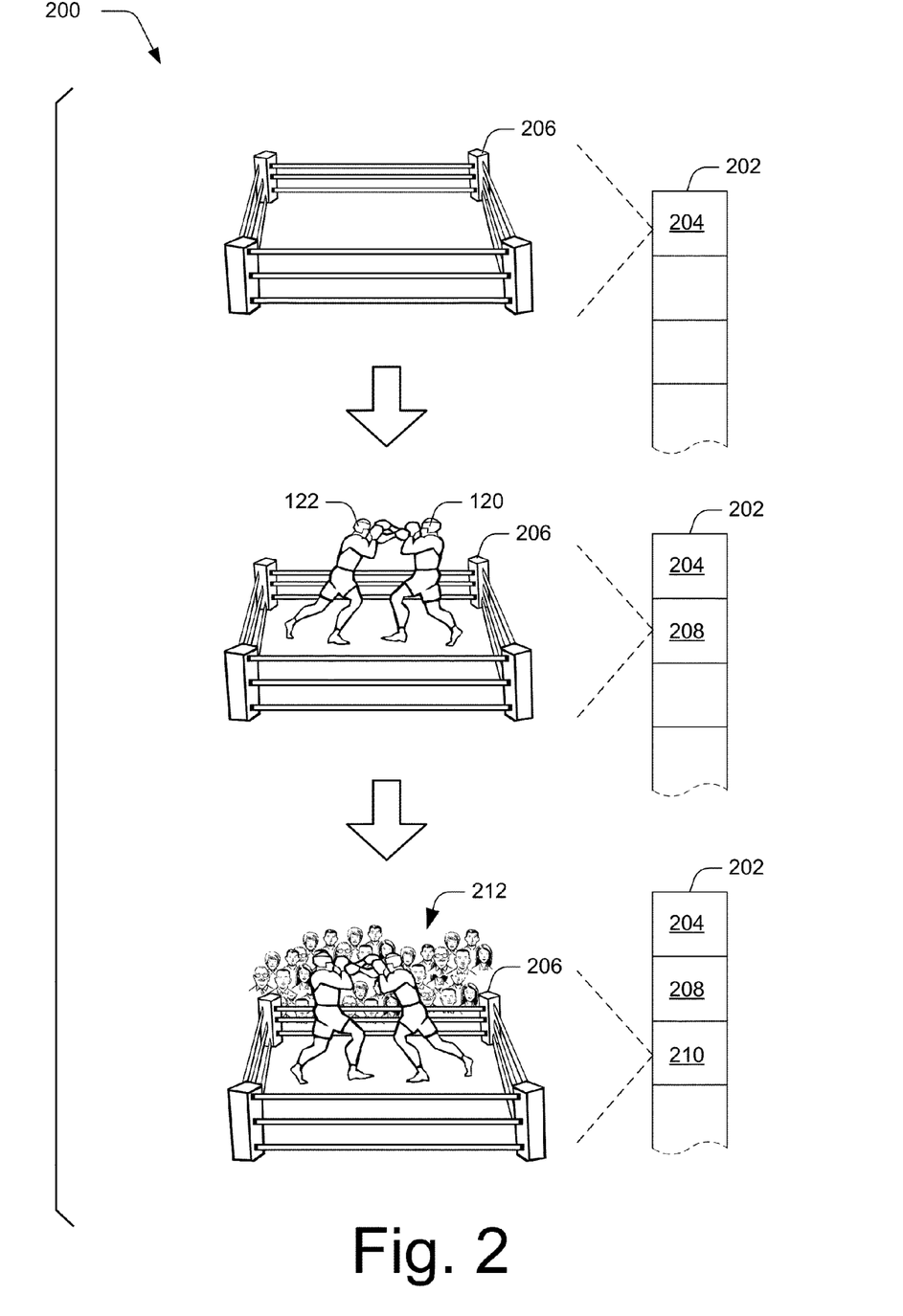
FIG. 2 illustrates an example implementation scenario in accordance with one or more embodiments.

FIG. 2 illustrates an example implementation scenario in accordance with one or more embodiments, generally at 200. The scenario 200 illustrates an example rendering and display of visual elements of the interactive content 104, such as during playback and/or gameplay of the interactive content.

Illustrated as part of the scenario 200 is a frame sequence 202, which corresponds to a sequence of frames that can be rendered and displayed during playback of the interactive content 104. Thus, the interactive content 104 may not itself consist of discrete frames, but the frames are representative of discrete render and/or display events during playback of the interactive content 104. For example, in a 60 Hz rendering scenario, each frame can correspond to $\frac{1}{60}$ of a second of rendering and/or display time.

Starting with upper portion of the scenario 200, an initialization frame 204 of the frame sequence 202 is displayed. For example, the initialization frame 204 can be displayed in response to an initialization of the interactive content 104, such as a user starting play of a video game. The initialization frame 204 includes a scene object 206, which can be an image that is stored as part of the interactive content 104, such as a pre-rendered image that can be retrieved and displayed without rendering. Additionally or alternatively, aspects of the scene object 206 can be rendered when the interactive content 104 is initialized.

In at least some implementations, various types of visual processing and/or rendering can be performed during display of the initialization frame 204. Examples of such processing include visual depth information processing, color processing, visual texture processing, and so forth. For instance, in a scenario where playback of the interactive content 104 occurs at a 60 Hz frame rate, the initialization frame 204 can correspond to $\frac{1}{60}$ of a second of playback time. Thus, $\frac{1}{60}$ of a second of background visual processing can occur during display of the initialization frame 204. In at least some implementations, the visual processing can be performed for visualizations that will be displayed as part of subsequent frames.

Continuing to the center portion of the scenario 200, a content frame 208 is displayed. The content frame 208 corresponds to a display frame that occurs subsequent to the initialization frame 204 during playback of the interactive content 104. The content frame 208 includes the scene object 206, as well as the interactive object 120 and the opponent avatar 122.

In at least some implementations, visual processing that was performed during display of the initialization frame 204 can be applied to the content frame 208. For instance, color, depth, and/or texture processing can be applied to display of the scene object 206. Thus, the scene object 206 in the content frame 208 can be visually enhanced when compared to display of the scene object 206 in the initialization frame 204.

Display of the interactive object 120 in the content frame 208 reflects user interaction, such as input from a user as part of gameplay for the interactive content 104. For example, gestures and/or movements of a user can be reflected in similar gestures and/or movements of the interactive object 120. In this particular example, user input causes interaction with the interactive object 120 as part of gameplay of a boxing game.

Further to at least some implementations, various types of visual processing can be performed during display of the content frame 208. For instance, visual processing for visualizations that are to be displayed in subsequent frames can be performed.

Proceeding to the lower portion of the scenario 200, a content frame 210 is displayed. The content frame 210 corresponds to a display frame that occurs subsequent to the content frame 208 during playback of the interactive content 104. The content frame 210 includes the scene object 206, as well as additional scene objects 212. The additional scene objects 212 are visualizations that were processed and/or rendered during previous frames, such as during display of the initialization frame 204 and/or the content frame 208. In this example, the additional scene objects 212 include visuals of spectators that appear to be viewing the interactive object 120 and the opponent avatar 122.

Display of the interactive object 120 is updated in the content frame 210 to reflect user input, such as user input provided during display of the content frame 208.

Thus, the scenario 200 illustrates that in at least some embodiments, scene objects can be visually updated intermittently, whereas interactive objects can be visually updated more frequently, e.g., in each frame of a frame sequence.

Figure 3:
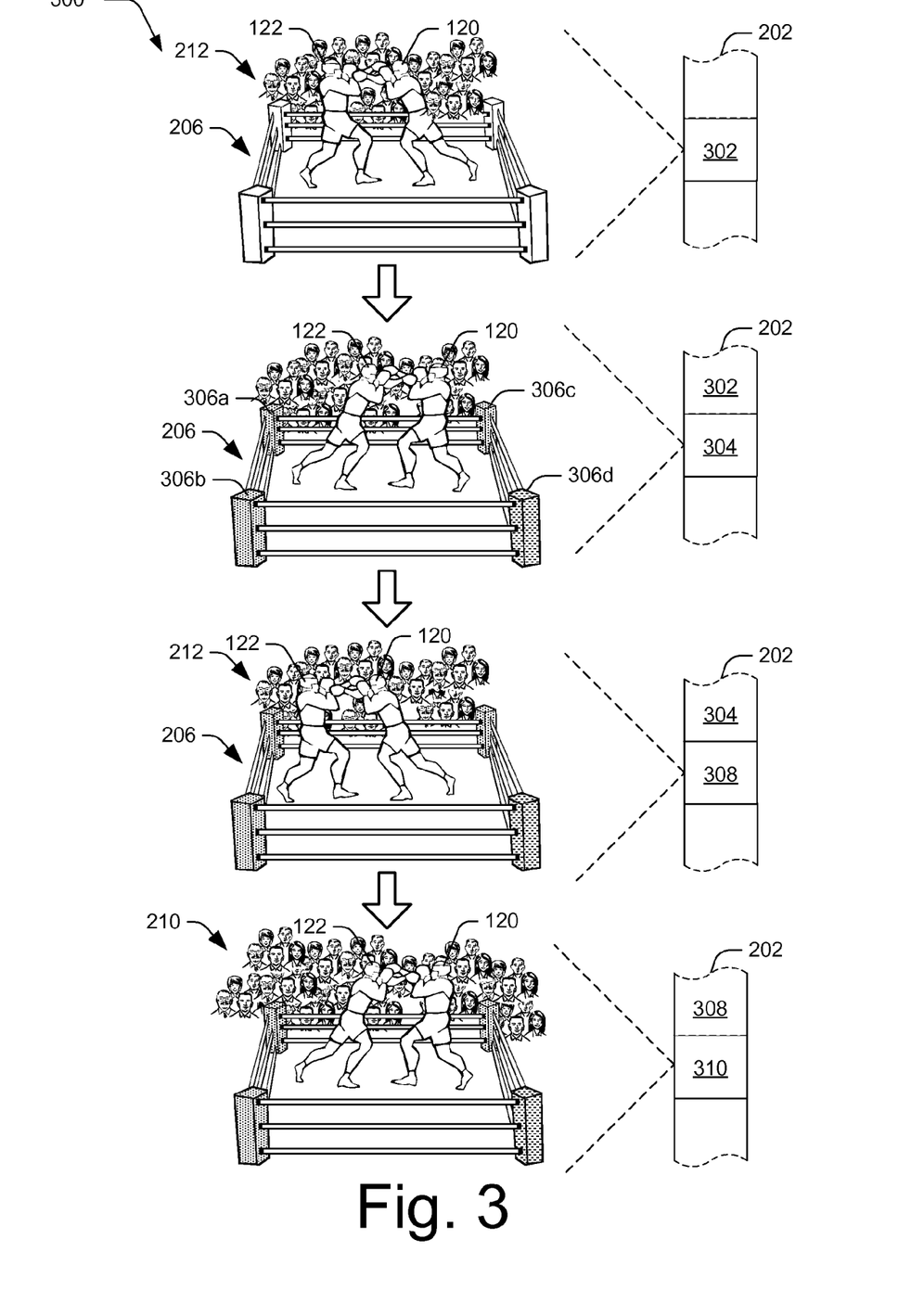
FIG. 3 illustrates an example implementation scenario in accordance with one or more embodiments.

FIG. 3 illustrates an example implementation scenario in accordance with one or more embodiments, generally at 300. In at least some implementations, the scenario 300 illustrates an example continuation of the scenario 200, discussed above.

Starting with the upper portion of the scenario 300, a content frame 302 of the frame sequence 202 is displayed. The content frame 302 includes the scene object 206, as well as the interactive object 120, the opponent avatar 122, and the additional scene objects 212. In at least some implementations, various visual aspects of the content frame 302 (e.g., the scene object 206 and/or the additional scene objects 212) are displayed the same as in a previous frame, e.g., as in the content frame 210 discussed above. For example, the scene object 206 and/or the additional scene objects 212 can be cached during display of the content frame 210, and can be re-displayed as part of the content frame 302.

Further, user interaction with the interactive object 120 during display of a previous frame (e.g., the content frame 210) can be reflected in the display of the interactive object 120 in the content frame 302.

During display of the content frame 302, various types of visual processing is performed, e.g., as background processes that are not visually evident in the content frame 302.

Proceeding to the next portion of the scenario 300, a content frame 304 is displayed. Illustrated in the content frame 304 is that visual processing that was previously performed (e.g., during display of the content frame 302) is applied to the display of the content frame 304. In this example, visual texture that was previously rendered is applied to the scene object 206, as shown in the portions 306a, 306b, 306c, and 306d.

Also illustrated in the content frame 304 is that display of the interactive object 120 is updated from the content frame 302 based on user input. For example, the position and/or action of the interactive object 120 is visually updated from the content frame 302.

During display of the content frame 304, various types of visual processing is performed, e.g., as background processes that are not visually evident in the content frame 304.

Proceeding to the next portion of the scenario 300, a content frame 308 is displayed. In the content frame 308, display of some visual aspects is the same as in the content frame 304. For example, the scene object 206 and/or the additional scene objects 212 are visually the same as in the content frame 304. The scene object 206 and the additional scene objects 212, for instance, can be cached during display of the content frame 304 for subsequent display as part of the content frame 308.

Also illustrated in the content frame 308 is that display of the interactive object 120 is updated from the content frame 304 based on user input. For example, the position and/or action of the interactive object 120 is visually updated from the content frame 304.

During display of the content frame 308, various types of visual processing is performed, e.g., as background processes that are not visually evident in the content frame 308.

Proceeding to the lower portion of the scenario 300, a content frame 310 is displayed. In the content frame 310, various visual aspects are updated based on previously-performed processing, such as processing performed during display of the content frame 308. For example, the additional scene objects 212 are visually augmented to include more scene objects. Visual rendering of the additional scene objects 212, for instance, may have occurred during display of the content frame 308.

Further, display of the interactive object 120 is updated from the content frame 308 based on user input. For example, the position and/or action of the interactive object 120 is visually updated from the content frame 308.

As discussed with previous frames, various types of visual processing can be performed during display of the content frame 310, such as visual processing for visual aspects that will be displayed in subsequent frames.

Thus, as described in the scenarios 200 and 300, various types of visual processing can be distributed among multiple frames during playback of content. For example, visual processing for some visual aspects (e.g., the scene object 206 and/or the additional scene objects 212) can occur over multiple frames. The visual processing of such visual aspects can be applied intermittently to visually update the visual aspects, such as every other frame, every third frame, and so forth. This can provide increased time for visual processing to enable the visual aspects to be rendered with increased detail, resolution, depth, and so forth.

Other visual aspects (e.g., the interactive object 120 and/or the opponent avatar 122) can be processed and visually updated more frequently, e.g., with every frame. This can enable responsiveness to user input and can decrease lag time between a user providing input and an interactive object reflecting the user input.

Having discussed some example implementation scenarios, consider now a discussion of some example procedures in accordance with one or more embodiments.

Example Procedures

Figure 4:
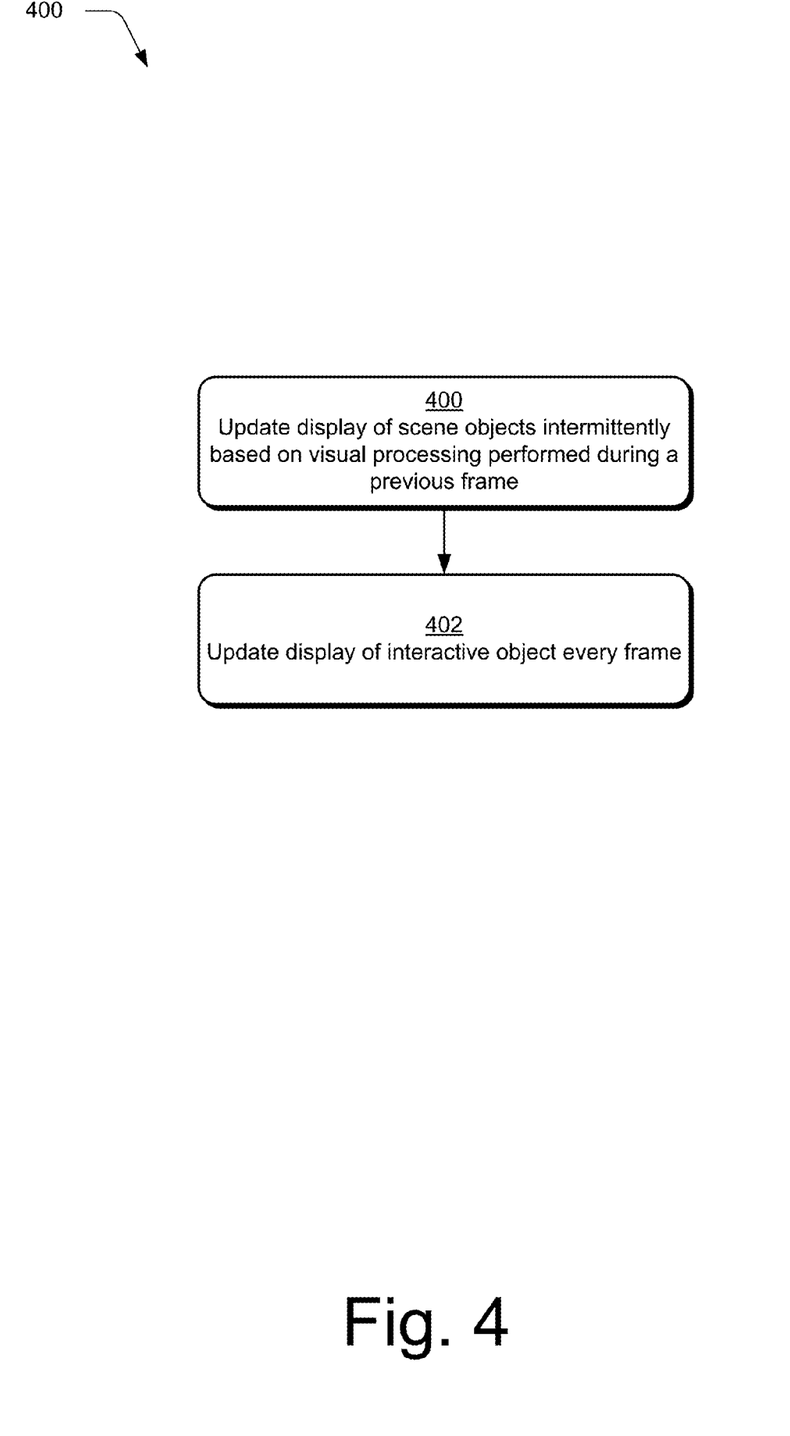
FIG. 4 is a flow diagram that describes steps in a method in accordance with one or more embodiments.

FIG. 4 is a flow diagram that describes steps in a method in accordance with one or more embodiments. Step 400 updates display of scene objects intermittently based on visual processing performed during a previous frame. As discussed above, a scene object can include background visuals, such as a visual environment in which an interactive object can be displayed. Thus, in at least some implementations, a scene object refers to a non-interactive object, such as a visual object that does not directly respond to user input.

For instance, display of a scene object can be updated according to a variety of different update patterns, such as every other frame in a sequence, every third frame, every fourth frame, and so forth. Alternatively or additionally, scene objects can be visually updated according to shifting update pattern. For example, scene objects can be updated every other frame for a specific number of frames and/or a specific period of playback time. After this, the scene objects can be updated according to a different update pattern, such as every third frame, every fourth frame, and so forth.

Step 402 updates display of an interactive object every frame. For instance, user input can be detected and used to update the display of the interactive object on a frame-by-frame basis, such as through movement of the interactive object and/or causing the interactive object to perform an action.

Figure 5:
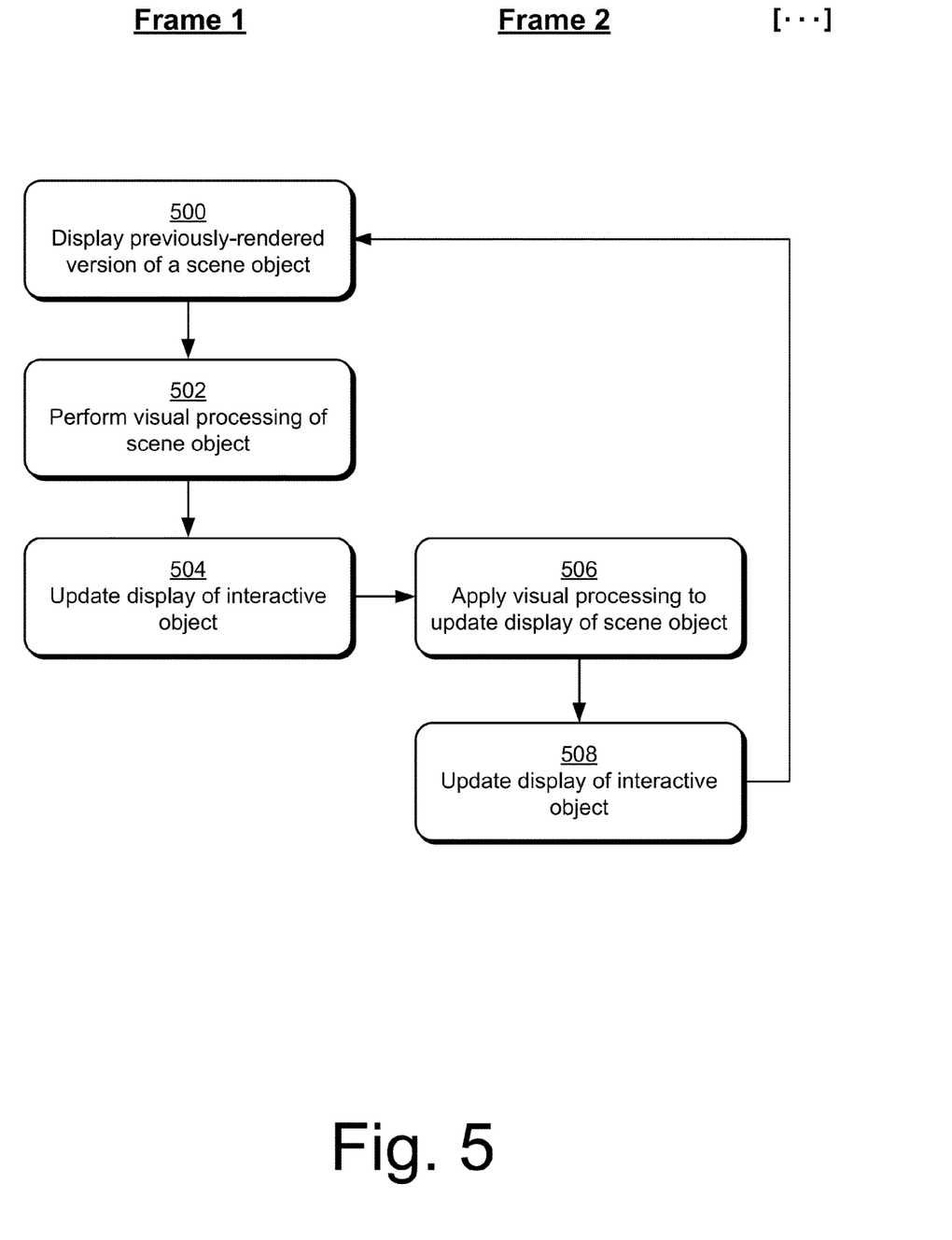
FIG. 5 is a flow diagram that describes steps in a method in accordance with one or more embodiments.

FIG. 5 is a flow diagram that describes steps in a method in accordance with one or more embodiments. The method is illustrated as steps being distributed over two frames of interactive content. Step 500 displays a previously-rendered version of a scene object. As discussed above, the previously-rendered version can be a stored image, such as a pre-rendered image of an object. Alternatively or additionally, the previously-rendered version can be an image that was rendered during a previous frame.

Step 502 performs visual processing for the scene object. As referenced above, various types of visual processing can be performed, such as color processing, texture processing, shadowing, depth processing, light processing, and so on. A variety of other types of visual processing are contemplated within the spirit and scope of the claimed embodiments.

Step 504 updates a display of an interactive object. For example, an interactive object (e.g., an avatar) can be visually updated based on user input.

Proceeding to frame 2, step 506 applies the visual processing to update the display of the scene object. For example, the various visual processing performed during frame 1 can be applied to enhance and/or alter the display of the scene object. Step 508 updates the display of the interactive object. For instance, user input provided during frame 1 can be processed and used to update the display of the interactive object.

In at least some implementations, the method can repeat during playback of the interactive content to enable scene objects to be visually updated intermittently, and interactive objects to be updated on a frame-by-frame basis. Further, embodiments are discussed with reference to two frames for purpose of example only, and embodiments can be employed according to wide variety of different frame patterns and/or sequences.

While embodiments are discussed herein with reference to video game interactive content, embodiments may be implemented utilizing a wide variety of different types of content. For example, embodiments can be employed in rendering and displaying interactions with other types of content, such as web content, applications, and so forth.

Example System and Device

Figure 6:
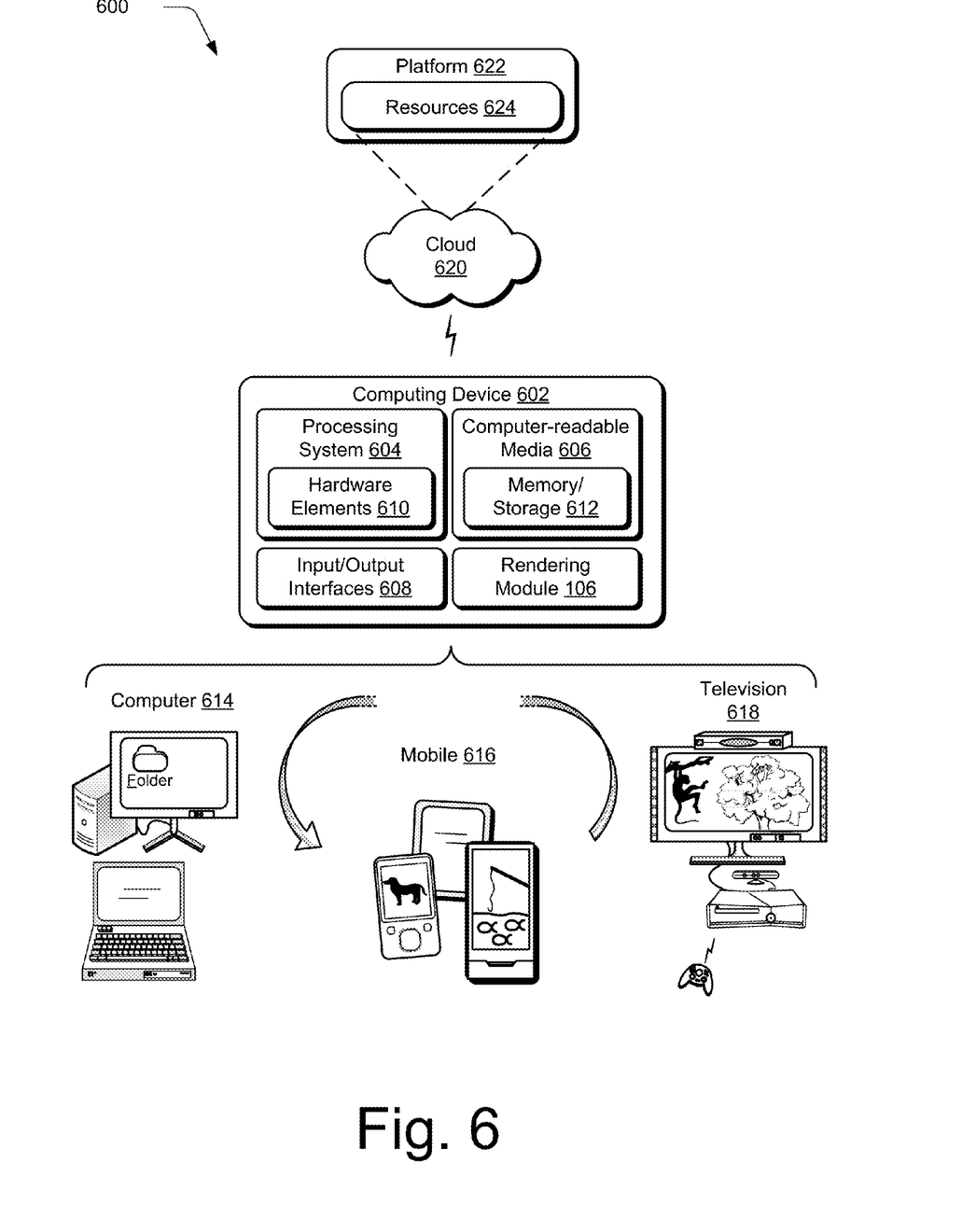
FIG. 6 illustrates an example system and computing device as described with reference to FIG. 1, which are configured to implement embodiments of techniques described herein.

FIG. 6 illustrates an example system generally at 600 that includes an example computing device 602 that is representative of one or more computing systems and/or devices that may implement various techniques described herein. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and non-transitory storage of information in contrast to mere signal transmission, carrier waves, or signals per se. Thus, computer-readable storage media does not include transitory signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as an module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the rendering module 106 on the computing device 602. The functionality of the rendering module 106 and/or other modules described with reference to FIG. 1 may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for multiple frame distributed rendering of interactive content are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method, comprising:
    displaying a previously-rendered version of a scene object as part of a frame of a video game, the scene object representative of visual scenery in the frame, the scene object being displayed on a display device of a computing device;
    performing, via the computing device, visual processing for the scene object during display of the frame to enable display of the scene object to update in a subsequent frame and without updating display of one or more visual aspects of the scene object in the frame, the visual processing including one or more of color processing, texture processing, depth processing, or light processing;
    updating, in the frame, display of an avatar from the video game, the avatar being representative of an object in the frame that is directly controllable responsive to a received input to the computing device, the avatar being displayed on the display device of the computing device; and
    applying the visual processing performed during display of the frame to the one or more visual aspects of the scene object in the subsequent frame of the video game as a single rendering operation to cause display of the scene object to be updated in the subsequent frame.

2. A method as described in claim 1, wherein the received input is received from a user as part of gameplay of the video game.

3. A method as described in claim 1, wherein the received input is based on user gestures detected via one or more cameras as part of gameplay of the video game.

4. A method as described in claim 1, wherein the scene object comprises a non-interactive visual object of the video game.

5. A method as described in claim 1, wherein display of the scene object is updated in every other frame during playback of the video game, and wherein display of the avatar is updated in each frame of the video game.

6. A method as described in claim 1, wherein display of the scene object is updated intermittently every two or more frames during playback of the video game, and wherein display of the avatar is updated more frequently than the display of the scene object.

7. A method as described in claim 1, wherein one or more of said updating in the frame comprises updating display of the avatar based on the received input.

8. A method comprising:
    performing, by a computing device, visual processing of scene objects and an avatar in individual frames of a sequence of a video game, the scene objects being representative of visual scenery of the video game, the avatar being directly controllable via a received user input to the computing device as part of gameplay of the video game, and both the scene objects and the avatar being displayed on a display device of the computing device;
    distributing the visual processing of the scene objects over two or more frames prior to applying the visual processing to the scene objects such that the scene objects in at least one of the two or more frames are not updated on the display device, the visual processing including one or more of color processing, texture processing, depth processing, or light processing;
    applying the visual processing to the scene objects to cause display of the scene objects to be updated on the display device in an individual frame of the sequence of the video game that is subsequent to the two or more frames during which the visual processing is distributed; and
    updating display of the avatar on the display device in each frame of the sequence of the video game.

9. A method as described in claim 8, wherein the scene objects comprise visual scenery in a particular frame in which the avatar is displayed.

10. A method as described in claim 8, wherein the distributing the visual processing of the scene objects over two or more frames prior to applying the visual processing to the scene objects enables the avatar that is user controllable, via the received user input, to be more responsive to the received user input relative to distributing the visual processing of the scene objects in each frame of the sequence of the video game.

11. A method as described in claim 8, wherein the avatar is directly controllable via user gestures detected via one or more cameras as part of gameplay of the video game.

12. A method as described in claim 8, wherein said updating display of scene objects comprises updating display of the scene objects every two or more frames of the sequence of the video game.

13. A method as described in claim 8, wherein display of the avatar is updated more frequently than the display of the scene objects.

14. One or more computer-readable storage media storing at least one module that is executable via a computing device to cause the computing device to perform operations comprising:
    performing visual processing of a scene object and an avatar in individual frames of a sequence of a video game such that the visual processing of the scene object and the avatar is performed continuously in the individual frames of the sequence of the video game, the scene object being representative of visual scenery of the video game, the avatar being directly controllable via a received user input to the computing device as part of gameplay of the video game, and both the scene object and the avatar being displayed on a display device of the computing device;
    distributing rendering of the scene object over multiple frames of the sequence of the video game such that the scene object is rendered over the multiple frames of the sequence of the video game prior to being updated on the display device, the rendering including performing one or more of color processing, texture processing, depth processing, or light processing;
    updating visual display of the avatar on the display device more frequently than visual display of the scene object during playback of the sequence of the video game such that in at least one frame of the sequence the visual display of the avatar is updated and the visual display of the scene object is not updated, the visual processing of the scene object being performed for the at least one frame in which the visual display of the scene object is not updated; and updating the visual display of the scene object on the display device in another frame of the sequence of video game based on the rendering of the scene object performed over the multiple frames.

15. One or more computer-readable storage media as described in claim 14, wherein the operations further comprise causing display of the scene object to be updated every two or more frames during playback of the sequence of the video game.

16. One or more computer-readable storage media as described in claim 14, wherein the operations further comprise causing display of the avatar to be updated in each frame of the sequence of the video game.

17. One or more computer-readable storage media as described in claim 14, wherein the operations further comprise causing the visual display of the scene object to be intermittently updated by applying the rendering performed during display of one or more previous frames of the sequence of video game, to a display of the scene object in a current frame of the video game.

18. One or more computer-readable storage media as described in claim 14, wherein the operations further comprise causing the visual display of the avatar to be updated based on the received user input.

19. One or more computer-readable storage media as described in claim 14, wherein the scene object comprises scenery in which the avatar can be displayed.

20. One or more computer-readable storage media as described in claim 14, wherein the operations further comprise causing the scene object to be rendered at a 30 hertz (Hz) frequency, and to cause the avatar to be rendered at a 60 Hz frequency.

* * * * *